United States Patent
Moore

(10) Patent No.: US 11,628,103 B2
(45) Date of Patent: Apr. 18, 2023

(54) SUPPORT DEVICES INCLUDING MOVABLE LEG SEGMENTS AND METHODS FOR OPERATING THE SAME

(71) Applicant: Toyota Motor North America, Inc., Plano, TX (US)

(72) Inventor: Douglas A. Moore, Fairview, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 409 days.

(21) Appl. No.: 16/860,490

(22) Filed: Apr. 28, 2020

(65) Prior Publication Data

US 2021/0330521 A1    Oct. 28, 2021

(51) Int. Cl.
| A61G 5/04 | (2013.01) |
| A61G 5/06 | (2006.01) |
| A61G 5/10 | (2006.01) |
| B62D 57/028 | (2006.01) |

(52) U.S. Cl.
CPC .............. *A61G 5/04* (2013.01); *A61G 5/068* (2013.01); *A61G 5/1078* (2016.11); *A61G 5/061* (2013.01); *B62D 57/028* (2013.01)

(58) Field of Classification Search
CPC ........ A61G 5/1059; A61G 5/04; A61G 5/068; A61G 5/1078; B62B 2206/06; F16H 2035/001; F16H 3/18; B62D 57/028; B62D 57/02
See application file for complete search history.

(56) References Cited

U.S. PATENT DOCUMENTS

| 5,314,238 | A | 5/1994 | Komorowski et al. |
| 6,484,829 | B1* | 11/2002 | Cox ..................... B62D 57/028 180/8.1 |
| 7,537,285 | B2 | 5/2009 | Stewart |
| 8,087,728 | B2 | 1/2012 | Corcoran |
| 8,783,709 | B1* | 7/2014 | Westermann .......... A61G 5/085 280/304.5 |
| 8,979,115 | B1* | 3/2015 | Baron ..................... B62B 3/106 280/DIG. 4 |
| 9,211,899 | B2* | 12/2015 | Beauchamp ............ B62B 3/027 |
| 10,137,042 | B2* | 11/2018 | Ishikawa .................. A61G 5/04 |
| 10,189,519 | B2* | 1/2019 | Hurst .................. B62D 57/032 |
| 10,905,607 | B2* | 2/2021 | Moore .................. A61G 5/041 |
| 10,912,691 | B2* | 2/2021 | Cherny ................ A61G 5/1067 |

(Continued)

FOREIGN PATENT DOCUMENTS

| KR | 20190002000 A | 1/2019 |
| WO | 2012146898 A1 | 11/2012 |
| WO | 2018224751 A1 | 12/2018 |

*Primary Examiner* — Emma K Frick
(74) *Attorney, Agent, or Firm* — Dinsmore & Shohl LLP

(57) ABSTRACT

A support device includes a wheel, a base member, a leg coupled to the wheel and the base member, the leg including an upper leg segment, a lower leg segment positioned below the upper leg segment, a joint positioned between the upper leg segment and the lower leg segment, and an actuator engaged with the upper leg segment and the lower leg segment, where the actuator includes a linear engagement member that is engaged with one of the upper leg segment and the lower leg segment, a cammed member defining a non-circular perimeter engaged with the linear engagement member, and a motor engaged with the linear engagement member through the cammed member.

7 Claims, 4 Drawing Sheets

(56) References Cited

U.S. PATENT DOCUMENTS

| | | | |
|---|---|---|---|
| 11,173,079 B2* | 11/2021 | Moore | A61G 5/047 |
| 11,312,436 B2* | 4/2022 | Mcginn | B62D 57/024 |
| 2012/0216347 A1 | 8/2012 | Tundo et al. | |
| 2019/0009158 A1* | 1/2019 | Kawasaki | A63B 65/12 |
| 2019/0365592 A1* | 12/2019 | Norton | A61H 3/04 |
| 2021/0330522 A1* | 10/2021 | Moore | A61G 5/04 |
| 2022/0151846 A1* | 5/2022 | Moore | A61G 5/085 |

* cited by examiner

SUPPORT DEVICES INCLUDING MOVABLE LEG SEGMENTS AND METHODS FOR OPERATING THE SAME

TECHNICAL FIELD

The present specification generally relates to support devices including movable leg segments and methods for operating the same.

BACKGROUND

Support devices, such as wheelchairs, assistive robots, mechanized walkers, and the like, are conventionally used to assist users in moving from one location to another. For example, motorized wheelchairs can move a user between locations, and assistive robots and mechanized walkers can provide support to a user moving between locations. In some instances, assistive robots and mechanized walkers may be used to carry objects between locations. Conventional support devices can include wheels that move along a surface, such as a floor or the ground, and can include legs coupled to the wheels. The legs may operate to move the support device upward and downward in the vertical direction, which can assist in moving the support device over uneven surfaces or obstacles.

SUMMARY

The inventor of the present disclosure has recognized that uneven torque may be applied to the legs of a support device while moving the support device in the vertical direction. Uneven torque may require excess energy to move the support device in the vertical direction, and may require oversized actuators to move the support device, thereby increasing cost and weight of the support device. Support devices according to embodiments described herein generally include a motor engaged with an engagement member that moves an upper leg segment with respect to a lower leg segment between an extended position and a retracted position. The engagement member applies variable force to the upper leg segment depending on the position of the upper leg segment and the lower leg segment with respect to one another, accommodating the varying torques acting on the upper leg segment and the lower leg segment in the extended position and the retracted position.

In one embodiment, a support device includes a wheel, a base member, a leg coupled to the wheel and the base member, the leg including an upper leg segment, a lower leg segment positioned below the upper leg segment, a joint positioned between the upper leg segment and the lower leg segment, and an actuator engaged with the upper leg segment and the lower leg segment, where the actuator includes a linear engagement member that is engaged with one of the upper leg segment and the lower leg segment, a cammed member defining a non-circular perimeter engaged with the linear engagement member, and a motor engaged with the linear engagement member through the cammed member, where the motor moves the linear engagement member moving the upper leg segment and the lower leg segment between an extended position, and a retracted position in which the upper leg segment and the lower leg segment are closer to one another as compared to the extended position, and where the linear engagement member applies a first force the one of the upper leg segment and the lower leg segment in the retracted position and applies a second force to the one of the upper leg segment and the lower leg segment in the extended position, where the first force is greater than the second force.

In another embodiment, a wheelchair includes a base member for supporting a person, a wheel, a leg coupled to the wheel and the base member, the leg including an upper leg segment, a lower leg segment positioned below the upper leg segment, a joint positioned between the upper leg segment and the lower leg segment, and an actuator engaged with the upper leg segment and the lower leg segment, where the actuator includes a linear engagement member that is engaged with one of the upper leg segment and the lower leg segment, a continuously variable transmission engaged with the linear engagement member, and a motor engaged with the linear engagement member through the continuously variable transmission, where the motor moves the linear engagement member moving the upper leg segment and the lower leg segment between an extended position, and a retracted position in which the upper leg segment and the lower leg segment are closer to one another as compared to the extended position, and where the linear engagement member applies a first force the one of the upper leg segment and the lower leg segment in the retracted position and applies a second force to the one of the upper leg segment and the lower leg segment in the extended position, where the first force is greater than the second force.

In yet another embodiment, a method for moving a leg of a support device includes moving a wheel of a support device along a surface, where the support device includes an upper leg segment, a lower leg segment positioned below the upper leg segment, the wheel coupled to the lower leg segment, and a joint positioned between the upper leg segment and the lower leg segment, and moving a linear engagement member through one of a cammed member and a continuously variable transmission, the linear engagement member engaged with the upper leg segment and the lower leg segment, thereby moving the upper leg segment and the lower leg segment from a retracted position to an extended position, where the upper leg segment and the lower leg segment are positioned closer to one another in the retracted position as compared to the extended position, and where the linear engagement member applies a first force to one of the upper leg segment and the lower leg segment when the upper leg segment and the lower leg segment are in the retracted position, and the linear engagement member applies a second force to the one of the upper leg segment and the lower leg segment when the upper leg segment and the lower leg segment are in the extended position, where the first force is greater than the second force.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally directed to support devices including an upper leg segment and a lower leg segment coupled to the upper leg segment at a joint. In embodiments, the upper leg segment and the lower leg segment are movably coupled to one another at the joint, and can move a base member of the support device upward or downward in a vertical direction. Embodiments described herein include a linear engagement member engaged with the upper leg segment and the lower leg segment. The linear engagement member, according to embodiments described herein, moves the upper leg segment and the lower leg segment by applying variable force to the upper leg segment or the lower leg segment to accommodate varying torques acting on the upper leg segment and the lower leg segment as a result of relative positioning of the base member. For example, in some embodiments, the linear engagement member is engaged with a cammed member that applies varying force to the upper leg segment or the lower leg segment through the linear engagement member. In some embodiments, the linear engagement member is engaged with a continuously variable transmission that applies varying force to the upper leg segment or the lower leg segment through the linear engagement member. These and other embodiments will now be described with specific reference to the appended drawings.

Figure 1:
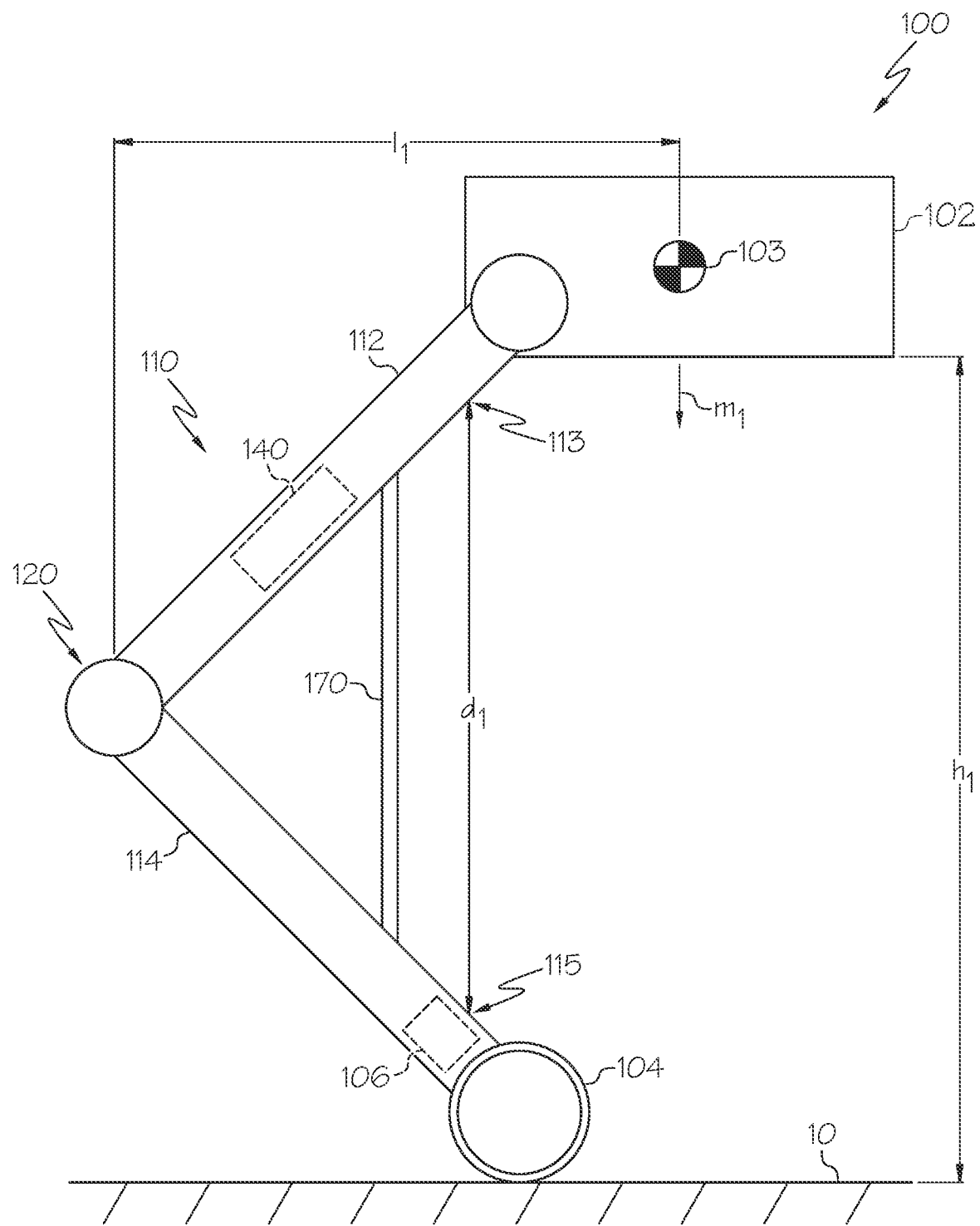
FIG. 1 schematically depicts a side view of a support device including an upper leg segment and a lower segment in an extended position, according to one or more embodiments shown and described herein.

Referring initially to FIG. 1 a side view of a support device 100 is schematically depicted. In embodiments, the support device 100 includes a base member 102. In some embodiments, the support device 100 is a wheelchair that supports a person, and the base member 102 may include a seat or the like. In some embodiments, the support device 100 may include an assistive robot, a mechanized walker, or the like, and the base member 102 may include a base of the robot or the mechanized walker. In some embodiments, the base member 102 may be structurally configured to carry items, for example groceries or other items that a user wishes to move from one location to another.

In embodiments, the support device 100 includes a leg 110 coupled to the base member 102, and a wheel 104 coupled to the leg 110. The wheel 104 is rotatably coupled to the leg 110 and may provide mobility to the support device 100 such that the support device 100 may move along a surface 10, such as the ground or a floor. The support device 100, in some embodiments, includes a wheel actuator 106 engaged with the wheel 104. The wheel actuator 106 rotates the wheel 104, and may provide the support device 100 with mobility along the surface 10. The wheel actuator 106 may include any suitable actuator to rotate the wheel 104, and may include for example and without limitation, a direct current (DC) motor, an alternating current (AC) motor, a hydraulic motor, a pneumatic motor, or the like.

Figure 2:
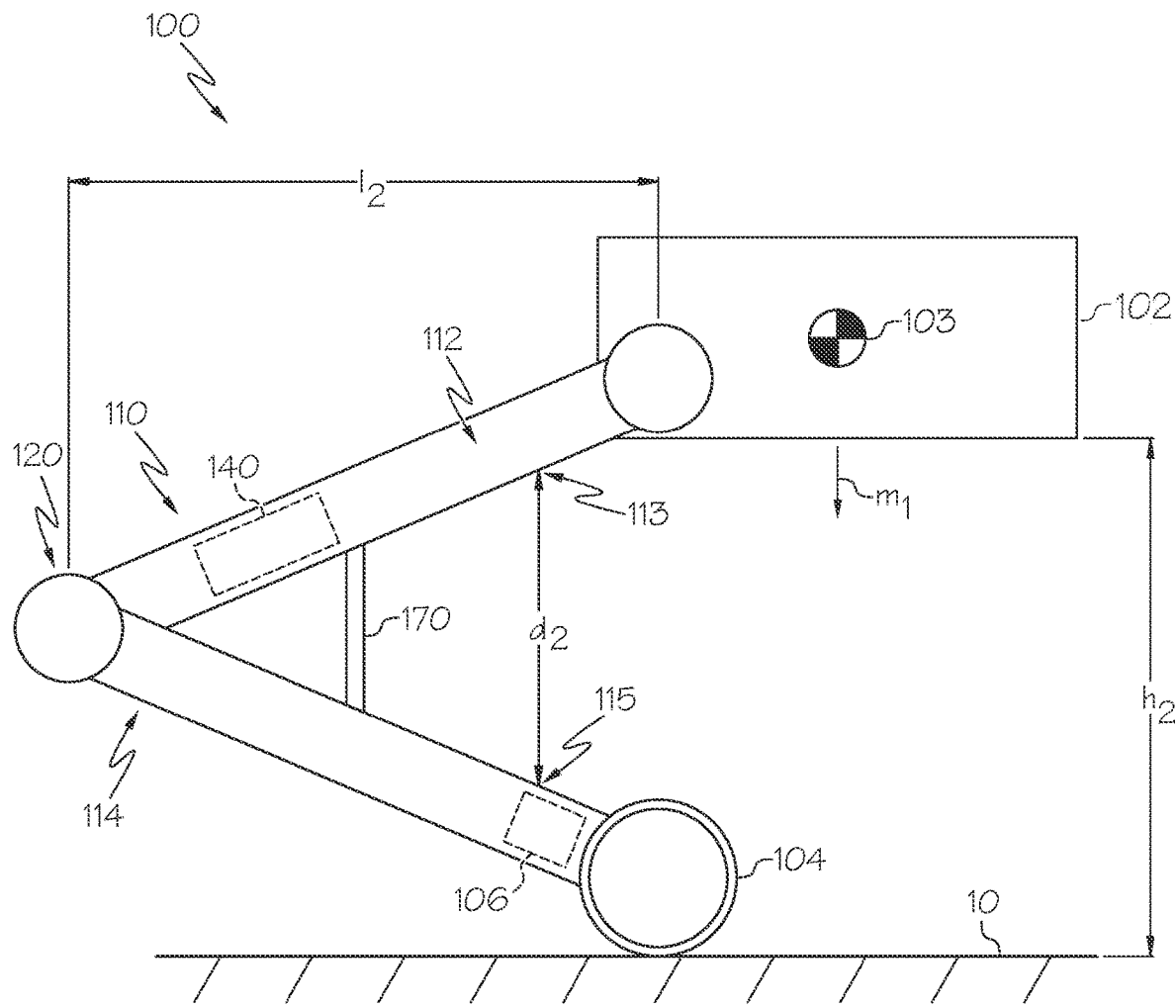
FIG. 2 schematically depicts a side view of the support device of FIG. 1 with the upper leg segment and the lower segment in a retracted position, according to one or more embodiments shown and described herein.

In embodiments, the leg 110 includes an upper leg segment 112 and a lower leg segment 114 positioned below the upper leg segment 112. The leg 110 further includes a joint 120 positioned between the upper leg segment 112 and the lower leg segment 114. The upper leg segment 112 and the lower leg segment 114 are rotatably coupled at the joint 120, such that the upper leg segment 112 and the lower leg segment 114 are positionable between an extended position, as depicted in FIG. 1, and a retracted position, as depicted in FIG. 2. In the extended position as depicted in FIG. 1, a portion 113 of the upper leg segment 112 is spaced apart from a portion 115 of the lower leg segment 114 by a distance d1. In the retracted position and as shown in FIG. 2, the portion 113 of the upper leg segment 112 is spaced apart from the portion 115 of the lower leg segment 114 by a distance d2, where the distance d2 is less than the distance d1 (FIG. 1). By moving the upper leg segment 112 and the lower leg segment 114 between the extended position (FIG. 1) and the retracted position (FIG. 2), the base member 102 can be raised or lowered with respect to the surface 10. For example, with the upper leg segment 112 and the lower leg segment 114 in the extended position (FIG. 1), the base member 102 is positioned above the surface 10 by a height h1. By contrast, with the upper leg segment 112 and the lower leg segment 114 in the retracted position (FIG. 2), the base member 102 is positioned above the surface 10 by a height h2, where the height h2 is less than the height h1 (FIG. 1). By raising or lowering the base member 102 with respect to the surface 10, a person (e.g., a user) sitting on or engaged with the base member 102 may be raised or lowered as desired.

Further, in embodiments, by moving the upper leg segment 112 and the lower leg segment 114 between the extended position (FIG. 1) and the retracted position (FIG. 2), the wheel 104 may be drawn upward toward, or lowered away from the base member 102. By raising or lowering the wheel 104 with respect to the base member 102, the support device 100 may accommodate obstacles, such as stairs, curbs, or the like. While the side views depicted in FIGS. 1 and 2 show the support device 100 as including a single leg 110, it should be understood that support devices 100 described herein may include any suitable number of legs. For example, in embodiments, the support device 100 may include two legs 110 (i.e., in a bicycle configuration) and may balance using gyroscopes or the like. In some embodiments, the support device 100 may include three legs 110 (i.e., in a tricycle configuration), or may include four or more legs 110. In embodiments including multiple legs, each of the legs can be similar to the leg 110 depicted in FIGS. 1 and 2, or in some embodiments, the support device 100 may include one or more legs or wheels coupled to the base member 102 including a different configuration than the leg 110. For example, in some embodiments, the support device 100 may include one or more legs or wheels coupled to the base member 102 that do not include the upper leg segment 112 and the lower leg segment 114, or the support device 100 may include one or more legs that are rigidly coupled to the base member 102 and are not generally movable in a vertical direction with respect to the base member 102.

In embodiments, the support device 100 includes an actuator 140 engaged with the upper leg segment 112 and the lower leg segment 114. In the embodiment depicted in FIG. 1, the actuator 140 is coupled to the upper leg segment 112, however it should be understood that this is merely an example. For example, in embodiments, the actuator 140 can be coupled to the lower leg segment 114. The actuator 140 moves the upper leg segment 112 and the lower leg segment 114 about the joint 120, as described in greater detail herein. While in the embodiment depicted in FIG. 1, the support device 100 includes the actuator 140 to move the upper leg segment 112 and the lower leg segment 114 about the joint 120, it should be understood that in some embodiments, the support device 100 may include multiple actuators to move the upper leg segment 112 and the lower leg segment 114 about the joint 120.

In some embodiments, the support device 100 includes a spring 170 coupled to the upper leg segment 112 and the lower leg segment 114. The spring 170 may include a gas spring or the like that generally resists force applied to the spring 170, thereby assisting in maintaining the position of the upper leg segment 112 with respect to the lower leg segment 114. As the upper leg segment 112 and the lower leg segment 114 move from the extended position (FIG. 1) to the retracted position (FIG. 2), the spring 170 is compressed. Conversely, as the upper leg segment 112 and the lower leg segment 114 move from the retracted position (FIG. 2) to the extended position (FIG. 1), the spring 170 is extended.

Figure 3:
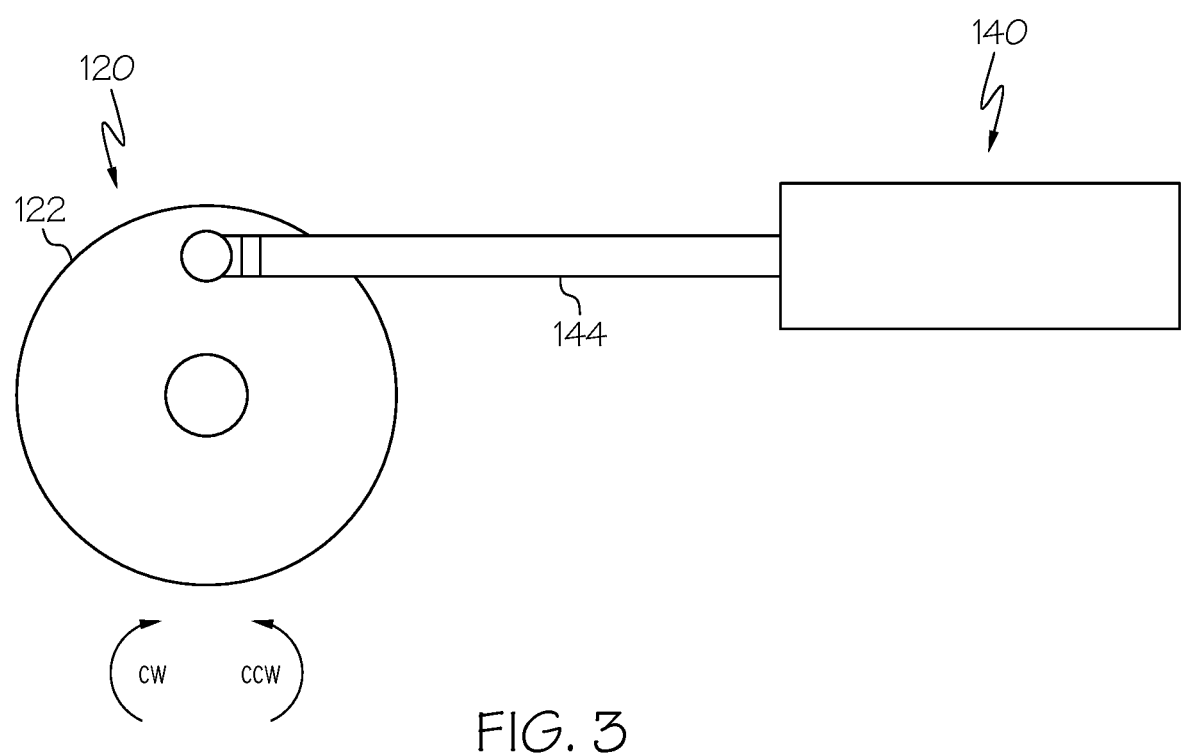
FIG. 3 schematically depicts a side view of an actuator engaged with a joint of the support device of FIG. 1, according to one or more embodiment shown and described herein.

Referring to FIG. 3, a side view of the joint 120 is schematically depicted. The joint 120 generally includes a cam 122 that is coupled to a linear engagement member 144 of the actuator 140. In embodiments, the cam 122 is rigidly coupled to the lower leg segment 114 (FIG. 1), such that the linear engagement member 144 is engaged with the lower leg segment 114 (FIG. 1) through the cam 122. Further, because the cam 122 is rigidly coupled to the lower leg segment 114 (FIG. 2), rotation of the cam 122 causes the lower leg segment 114 (FIG. 1) to rotate about the joint 120. For example, as the cam 122 rotates in the clockwise direction as depicted, the lower leg segment 114 (FIG. 1) rotates about the joint 120 in the clockwise direction, and as the cam 122 rotates in the counter-clockwise direction as depicted, the lower leg segment 114 (FIG. 1) rotates about the joint 120 in the counter clockwise direction.

In some embodiments, for example in embodiments in which the actuator 140 is coupled to the lower leg segment 114 (FIG. 1), the cam 122 is rigidly coupled to the upper leg segment 112 (FIG. 1). In these embodiments, the linear engagement member 144 is engaged with the upper leg segment 112 (FIG. 1) through the cam 122. As the cam 122 rotates in the clockwise direction, in these embodiments, the upper leg segment 112 (FIG. 1) rotates about the joint 120 in the clockwise direction, and as the cam 122 rotates in the counter-clockwise direction, the upper leg segment 112 (FIG. 1) rotates about the joint 120 in the counter-clockwise direction.

Figure 4A:
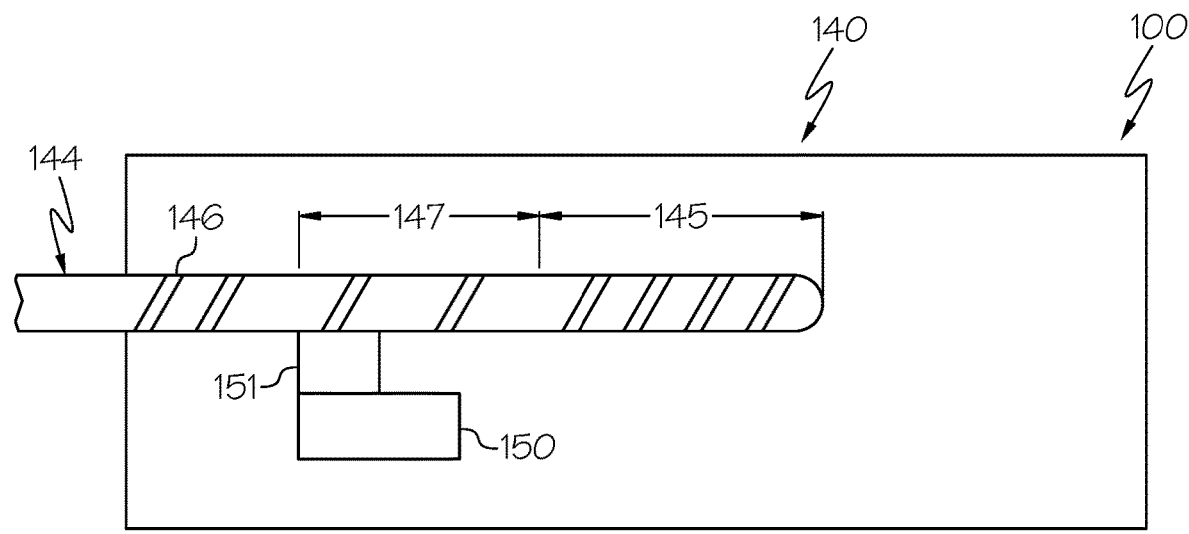
FIG. 4A schematically depicts an enlarged view of the actuator of FIG. 3, according to one or more embodiments shown and described herein.

Referring to FIG. 4A, an enlarged view of the actuator 140 and the linear engagement member 144 is schematically depicted. In embodiments, the linear engagement member 144 may be cylindrically-shaped and include a thread 146 extending along the linear engagement member 144. In some embodiments, the thread 146 defies a first pitch at a first portion 145 of the linear engagement member 144, and defines a second pitch at a second portion 147 of the linear engagement member 144 that is spaced apart from the first portion 145. In embodiments, the first pitch and the second pitch are different. For example in the embodiment depicted in FIG. 4A, the second pitch at the second portion 147 of the linear engagement member 144 is less than the first pitch at the first portion 145 of the linear engagement member 144. By varying the pitch of the thread 146 along the linear engagement member 144, the distance the linear engagement member 144 moves upon application of force by a motor 150 engaged with the thread 146 varies, as described in greater detail herein. While the embodiment depicted in FIG. 4A includes the linear engagement member 144 with the thread 146 having a variable pitch, it should be understood that in some embodiments, the thread 146 may include a constant pitch. Further, while the linear engagement member 144 is depicted as including thread 146, it should be understood that this is merely an example. For example, in some embodiments, the linear engagement member 144 may include a toothed rack or the like.

In embodiments, the actuator 140 includes the motor 150 engaged with the linear engagement member. In embodiments, the motor 150 is operable to extend the linear engagement member 144 outward from the actuator 140 to an extended position, and to draw the linear engagement member 144 inward toward the actuator 140 to a retracted position, where the linear engagement member 144 extends further outward from the actuator 140 in the extended position as compared to the retracted position. The motor 150 may include any suitable motor to move the linear engagement member 144, for example and without limitation, a direct current (DC) motor, an alternating current (AC) motor, a hydraulic motor, a pneumatic motor, or the like.

In the embodiment depicted in FIG. 4A, the support device 100 includes a continuously variable transmission (CVT) 151 engaged with the linear engagement member 144 and the motor 150. In embodiments, the CVT 151 transmits force applied to the CVT 151 by the motor 150 to the linear engagement member 144, moving the linear engagement member 144 outward from or inward toward the actuator 140. In embodiments, the CVT applies a first force to the linear engagement member 144 when the upper leg segment 112 (FIG. 1) and the lower leg segment 114 (FIG. 1) are in the extended position (FIG. 1) and applies a second force to the linear engagement member 144 when the upper leg segment 112 (FIG. 2) and the lower leg segment 114 (FIG. 2) are in the retracted position (FIG. 2), where the first force is greater than the second force. By applying variable force to the linear engagement member 144, the linear engagement member 144 may apply variable force to the cam 122 (FIG. 3) moving the upper leg segment 112 (FIG. 2) and the lower leg segment 114 (FIG. 2), as described in greater detail herein.

For example and referring to FIGS. 1-3, to move the upper leg segment 112 and the lower leg segment 114 from the retracted position (FIG. 2) to the extended position (FIG. 1), the actuator 140 draws the linear engagement member 144 toward the actuator 140, thereby causing the cam 122 to rotate in the clockwise direction as depicted. As noted above, in embodiments, the cam 122 may be coupled to the lower leg segment 114, such that as the cam 122 rotates in the clockwise direction, the lower leg segment 114 rotates in the clockwise direction about the joint 120, thereby moving into the extended position as shown in FIG. 1.

Conversely, to move the upper leg segment 112 and the lower leg segment 114 from the extended position (FIG. 1) to the retracted position (FIG. 2), in embodiments, the actuator 140 moves the linear engagement member 144 outward from the actuator 140, thereby causing the cam 122 to rotate in the counter-clockwise direction as depicted. As noted above, in embodiments, the cam 122 may be coupled to the lower leg segment 114, such that as the cam 122 rotates in the counter-clockwise direction, the lower leg segment 114 rotates in the counter-clockwise direction about the joint 120, thereby moving into the retracted position as shown in FIG. 2.

In embodiments, the weight of the base member 102 (FIG. 1) applies different torques to the joint 120 (FIG. 1) depending on the position of the leg 110. For example and referring to FIG. 1, with the upper leg segment 112 and the lower leg segment 114 in the extended position, the base member 102 applies a torque to the joint according the following equation:

$$T1 = m1 * l1$$

In the above equation, m1 is force associated with the mass of the base member 102 (e.g., the mass of the base member 102*gravitational constant), l1 is a distance between a center of mass 103 of the base member 102 and the joint 102, and T1 is the torque applied to the joint 102.

By contrast and referring to FIG. 2, with the upper leg segment 112 and the lower leg segment 114 in the retracted position, the center of mass 103 of the base member 102 is farther away from the joint, and the base member 102 applies a torque to the joint 120 according to the following equation:

$$T2 = m1 * l2$$

In the above equation, m1 is force associated with the mass of the base member 102 (e.g., the mass of the base member 102*gravitational constant), l2 is a distance between the center of mass 103 of the base member 102 and the joint 102, and l2 is the torque applied to the joint 102. As depicted in FIGS. 1 and 2, the distance l2 between the center of mass 103 of the base member 102 and the joint 120 with the upper leg segment 112 and the lower leg segment 114 in the retracted position (FIG. 2) is greater than the distance l1 between the center of mass 103 of the base member and the joint 120 with the upper leg segment 112 and the lower leg segment 114 in the extended position (FIG. 1). Accordingly, the torque T1 on the joint 120 associated with the mass of the base member 102 with the leg 110 in the extended position (FIG. 1) is less than the torque T2 on the joint 120 associated with the mass of the base member 102 with the leg 110 in the retracted position (FIG. 2).

As noted above, the CVT 151 (FIG. 4A) applies variable force to the linear engagement member 144, in particular, applying a first force to the linear engagement member 144 when the upper leg segment 112 and the lower leg segment 114 are in the extended position (FIG. 1) and applying a second force to the linear engagement member 144 when the upper leg segment 112 and the lower leg segment 114 are in the retracted position (FIG. 2), where the first force is greater than the second force. Because the linear engagement member 144 is coupled to the lower leg segment 112 through the cam 122, linear engagement member 144 applies the first force to the lower leg segment 114 when the upper leg segment 112 and the lower leg segment 114 are in the extended position (FIG. 1), and applies the second force to the lower leg segment 114 when the upper leg segment 112 and the lower leg segment 114 are in the retracted position (FIG. 2). By applying greater force to the lower leg segment 114 when the upper leg segment 112 and the lower leg segment 114 are in retracted position (FIG. 2), and lower force to the lower leg segment 114 when the upper leg segment 112 and the lower leg segment 114 are in the extended position (FIG. 1), the CVT 151 (FIG. 4), through the linear engagement member 144 may overcome the different torques applied to the leg 110 by the base member 102 in the extended position and the retracted position, while receiving the same amount of force from the motor 150 (FIG. 4A). In this way, the size of the motor 150 can be minimized, reducing the size of the motor 150 and overall weight of the support device 100.

Figure 4B:
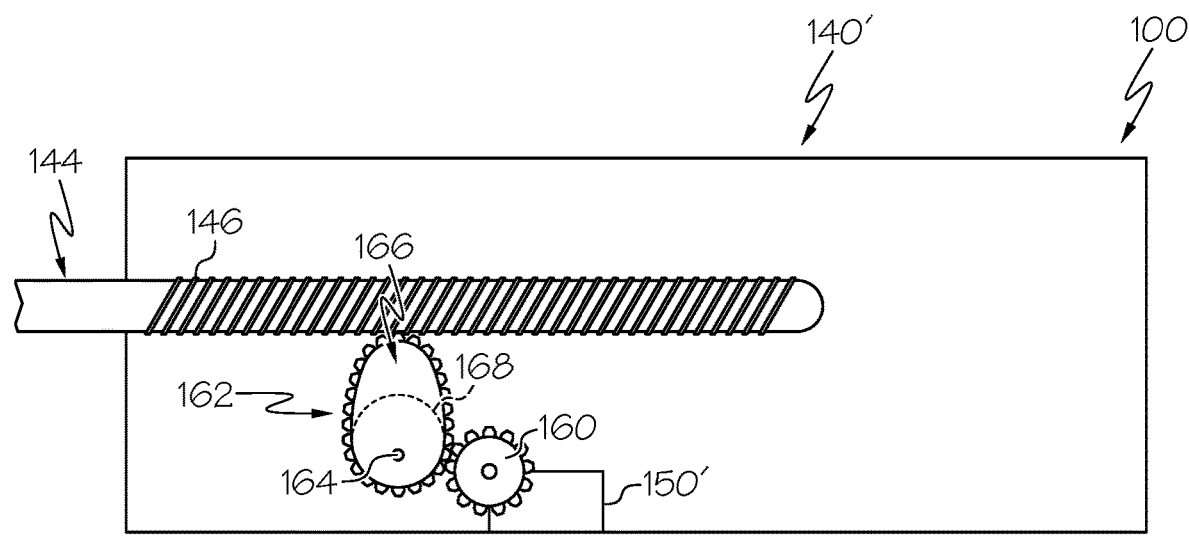
FIG. 4B schematically depicts an enlarged view of another actuator, according to one or more embodiments shown and described herein.

Referring to FIG. 4B, another embodiment of the actuator 140' is schematically depicted. Similar to the embodiment described above and depicted in FIG. 4A, the actuator 140' includes the linear engagement member 144 and the motor 150'. Further the linear engagement member 144 includes the thread 146. However, in the embodiment depicted in FIG. 4B, the actuator 140' includes a cammed member 162 engaged with the linear engagement member 144. The cammed member 162, in embodiments, includes a non-circular perimeter, and in the embodiment depicted in FIG. 4B includes an elliptical or egg-shape. In some embodiments, the cammed member 162 is a non-circular gear engaged with the motor 150' and the linear engagement member 144, however, it should be understood that this is merely an example.

In embodiments, the cammed member 162 is engaged with a motor engagement member 160 of the motor 150, and the cammed member 162 rotates about a rotational axis 164 as the motor engagement member 160 rotates. In the embodiment depicted in FIG. 4B, the cammed member 162 defines a lobe 166 that extends outward from a base circle 168 of the cammed member, where the lobe 166 extends a greater distance outward from the rotational axis 164 as compared to the base circle 168. Through the cammed member 162, the force applied to the linear engagement member 144 varies. For example, when the lobe 166 of the cammed member 162 is engaged with the linear engagement member 144, the torque and accordingly the force applied to the linear engagement member 144 by the cammed member 162 is higher than when portions of the cammed member 162 along the base circle 168 are engaged with the linear engagement member. Accordingly, through the cammed member 162, the linear engagement member 144 may applies the first force to the lower leg segment 114 when the upper leg segment 112 and the lower leg segment 114 are in the extended position (FIG. 1), and applies the second force to the lower leg segment 114 when the upper leg segment 112 and the lower leg segment 114 are in the retracted position (FIG. 2). In particular, the lobe 166 of the cammed member 162 is engaged with and applies force to the linear engagement member 144 when the upper leg segment 112 (FIG. 2) and the lower leg segment 114 (FIG. 2) are in the retracted position (FIG. 2) m and portions of the cammed member 162 along the base circle 168 engage and apply force to the linear engagement member 144 when the upper leg segment 112 (FIG. 1) and the lower leg segment 114 (FIG. 1) are in the extended position (FIG. 1).

It should now be understood that embodiments described herein are generally directed to support devices including an upper leg segment and a lower leg segment coupled to the upper leg segment at a joint. In embodiments, the upper leg segment and the lower leg segment are movably coupled to one another at the joint, and can move a base member of the support device upward or downward in a vertical direction. Embodiments described herein include a linear engagement member engaged with the upper leg segment and the lower leg segment. The linear engagement member, according to embodiments described herein, moves the upper leg segment and the lower leg segment by applying variable force to the upper leg segment or the lower leg segment to accommodate varying torques acting on the upper leg segment and the lower leg segment as a result of relative positioning of the base member. For example, in some embodiments, the linear engagement member is engaged with a cammed member that applies varying force to the upper leg segment or the lower leg segment through the linear engagement member. In some embodiments, the linear engagement member is engaged with a continuously variable transmission that applies varying force to the upper leg segment or the lower leg segment through the linear engagement member.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A support device comprising:
   a wheel;
   a base member;
   a leg coupled to the wheel and the base member, the leg comprising: an upper leg segment;
   a lower leg segment positioned below the upper leg segment;
   a joint positioned between the upper leg segment and the lower leg segment; and an actuator engaged with the upper leg segment and the lower leg segment, wherein the actuator comprises:
      a linear engagement member that is engaged with one of the upper leg segment and the lower leg segment;
      a cammed member defining a non-circular perimeter engaged with the linear engagement member; and
      a motor engaged with the linear engagement member through the cammed member, wherein the motor moves the linear engagement member moving the upper leg segment and the lower leg segment between an extended position, and a retracted position in which the upper leg segment and the lower leg segment are closer to one another as compared to the extended position, and wherein the linear engagement member applies a first force to the one of the upper leg segment and the lower leg segment in the retracted position and applies a second force to the one of the upper leg segment and the lower leg segment in the extended position, wherein the first force is greater than the second force.

2. The support device of claim 1, further, wherein the cammed member comprises a non-circular gear engaged with the motor and the linear engagement member.

3. The support device of claim 1, wherein the linear engagement member comprises a thread extending along the linear engagement member and wherein the motor is engaged with the thread through the cammed member.

4. The support device of claim 1, wherein the cammed member defines a lobe that extends outward from a base circle of the cammed member.

5. The support device of claim 4, wherein the lobe is engaged with the linear engagement member when the when the lower leg segment and the upper leg segment are in the retracted position.

6. The support device of claim 1, further comprising a spring coupled to the upper leg segment and the lower leg segment.

7. The support device of claim 1, further comprising a wheel actuator engaged with the wheel.

* * * * *

UNITED STATES PATENT AND TRADEMARK OFFICE
CERTIFICATE OF CORRECTION

PATENT NO. : 11,628,103 B2
APPLICATION NO. : 16/860490
DATED : April 18, 2023
INVENTOR(S) : Douglas A. Moore It is certified that error appears in the above-identified patent and that said Letters Patent is hereby corrected as shown below:

In the Specification

In Column 3, Line(s) 7, delete "embodiment" and insert --embodiments--, therefor.

In Column 7, Line(s) 28, delete "l2" and insert --T2--, therefor.

In the Claims

In Column 10, Line(s) 25 & 26, Claim 5, after "when the", delete "when the".

Signed and Sealed this
Sixth Day of June, 2023

*Katherine Kelly Vidal*
*Director of the United States Patent and Trademark Office*